United States Patent
Smith

[15] 3,696,449
[45] Oct. 10, 1972

[54] INFLATABLE AUTOMOBILE INTERIOR CONSTRUCTION

[72] Inventor: William C. Smith, Howard Avenue RR # 1, Old Castle, Ontario, Canada

[22] Filed: Dec. 17, 1970

[21] Appl. No.: 99,034

Related U.S. Application Data

[63] Continuation-in-part of Ser. No. 783,803, Dec. 16, 1968, abandoned.

[52] U.S. Cl. ..........................5/94, 297/DIG. 3, 5/118
[51] Int. Cl. ..........................A47d 7/04, A47c 19/16
[58] Field of Search........5/94, 118; 297/456, DIG. 3, 297/230, 231, 244, 245

[56] References Cited

UNITED STATES PATENTS

| | | | |
|---|---|---|---|
| 2,648,072 | 8/1953 | De Blieux | 5/94 |
| 3,265,438 | 8/1966 | Regan et al. | 297/456 X |
| 2,612,645 | 10/1952 | Boland | 297/DIG. 3 |
| 3,167,790 | 2/1965 | Hickey | 297/DIG. 3 |

*Primary Examiner*—James C. Mitchell
*Attorney*—William L. Fisher

[57] ABSTRACT

A portable inflatable automobile interior construction is disclosed which with conventional automobile seating forms in the automobile a safe rear play area for toddlers; said construction comprises top and bottom inflatable cushion means, said bottom cushion means constructed so that when inflated the same will fill the leg room between the front and rear automobile seats, said top cushion means constructed so that when inflated the same is in part supported upright on said bottom cushion means and will line the back of said front automobile seat and the opposite interior sides of the automobile between said front and rear automobile seats.

5 Claims, 4 Drawing Figures

PATENTED OCT 10 1972  3,696,449
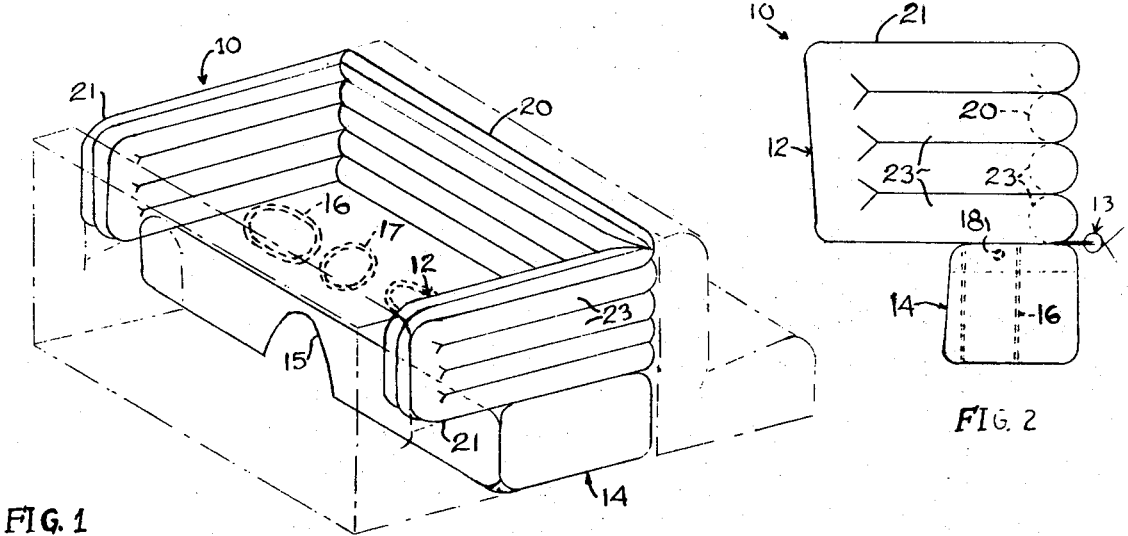
FIG. 1  
FIG. 2
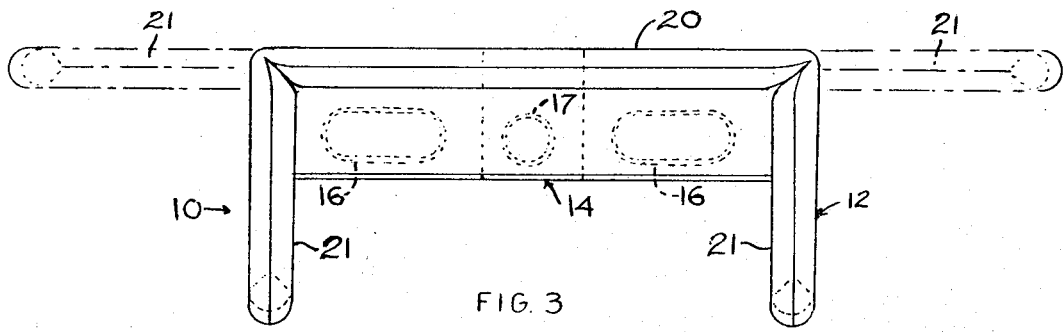
FIG. 3
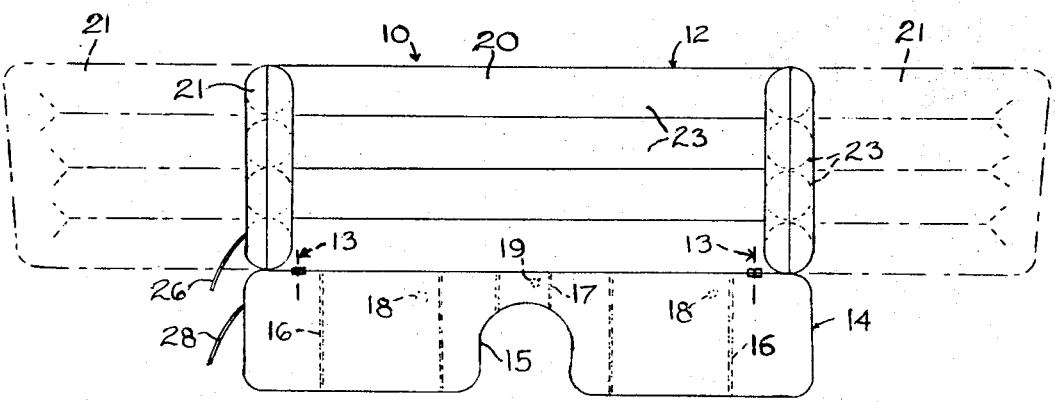
FIG. 4
WILLIAM C. SMITH  
INVENTOR  
William L. Fisher Esq.  
HIS ATTORNEY

INFLATABLE AUTOMOBILE INTERIOR CONSTRUCTION

This application is a continuation-in-part of my prior copending patent application, Ser. No. 783,803 filed Dec. 16, 1968 now abandoned.

My invention relates to automobiles.

The principal object of my invention is the provision of a portable inflatable automobile interior construction which with conventional automobile seating forms in the automobile a safe rear play area for toddlers.

The foregoing object of my invention and the advantages thereof will become apparent during the course of the following description, taken in conjunction with the accompanying drawings, in which FIGS. 1, 2, 3 and 4 are, respectively, perspective, right side, top plan and rear elevational views of a portable inflatable automobile interior construction embodying my invention.

Referring to the drawings in greater detail, 10 designates said embodiment which comprises top and bottom inflatable cushion means 12 and 14, respectively, which are preferably tied together at the front ends thereof by at least two sets of respective fastening means in the form of integral eyelets and ropes 13 extending therethrough and tied together. Said bottom cushion means 14 is constructed so that when inflated the same will fill the leg room between the front and rear automobile seats such that said leg room space will be completely filled with said bottom cushion means 14 and no leg room space will remain. The side walls of said bottom cushion means 14 press against the opposite interior sides of the automobile and the front and back walls press, respectively, against the rear of the front automobile seat and the front of the rear automobile seat. Said bottom cushion means 14 has shape retainer means 16 and 17 in the form of vertical walls which, in the instance, form compartments in communication, as by air passage apertures 18 and 19, respectively, with the main interior of said bottom cushion means 14. Said bottom cushion means 14 when inflated and pressed against the automobile interior side walls and seating structure as mentioned has side and front and back walls in conformity, respectively, with said automobile interior side walls and with said front and back seating structure. Said bottom cushion means 14 is formed with a recess 15 in the bottom wall thereof to accommodate the drive shaft hump in the automobile floor in those instances where the interior of the automobile is so constructed with such hump. Said top cushion means 12 is constructed so that when inflated the same is normally planar as indicated by the dash dot lines in FIGS. 3 and 4 but when in use with the bottom cushion means 14 in an automobile interior the same stands upright upon said bottom cushion means 14 and can be folded into a center section 20 and two wing sections 21 perpendicularly disposed to said center section 20. Preferably the top cushion means 12 is formed with a plurality of longitudinally extending contiguous ribs 23. Said center section 20 when inflated will line the back of said front automobile seat and said wing sections 21 will line the opposite interior sides of the automobile between said front and rear automobile seats. Rearwardmost portions of said wing sections 21 overhang said bottom cushion means 14, as shown in FIGS. 1 and 4. The extent of such overhang will depend upon the overall length of said top cushion means 12 which is preferably made in three sizes to accommodate all the models of present day passenger automobiles. Said bottom cushion means 14 can be fabricated in one size to accommodate all present day automobile models since merely the largest leg room space need be accommodated as smaller leg room spaces will limit the extent of inflation of said bottom cushion means 14. Mutual compression of said center section 20 and of said wing sections 21 occurs at the two right angled folds when said wing sections 21 are in position lining the opposite interior sides of the automobile. As a consequence of said mutual compression said wing sections 21 are forced outwardly away from each other against the opposite interior sides of the automobile. Said top and bottom inflatable cushion means are separately inflatable as by blowing into them through manually sealable air tubes 26 and 28 which communicate with the interiors, respectively, of said top and bottom cushion means 12 and 14, respectively. Said top and bottom cushion means may be made of rubber or plastic with or without fabric covering or of fabric with rubber bladders.

It will thus be seen that there has been provided by my invention a portable inflatable automobile interior construction in which the object hereinabove set forth together with many thoroughly practical advantages has been successfully achieved. While a preferred embodiment of my invention has been shown and described it is to be understood that variations and changes may be resorted to without departing from the spirit of my invention as defined by the appended claims.

What I claim is:

1. An inflatable automobile interior construction which with conventional automobile seating forms in the automobile a rear play area for toddlers, said construction comprising top and bottom inflatable cushion means, said bottom cushion means constructed so that when inflated the same will fill the leg room between the front and rear automobile seats, said top cushion means constructed so that when inflated the same is supported upright and in part on said bottom cushion means and will line the back of said front automobile seat and the portions of the opposite interior sides of the automobile which extend between said front and rear automobile seats.

2. An inflatable automobile interior construction as claimed in claim 1, said top cushion means capable of being folded into sections, a center one of which when inflated will line the back of said front automobile seat and opposite side ones of which when inflated will line said portions of the opposite interior sides of the automobile which extend between said front and rear automobile seats, portions of said opposite side sections of said top cushion means overhanging said bottom cushion means.

3. An inflatable automobile interior construction as claimed in claim 1, including means for releasably joining said top and bottom cushion means together.

4. An inflatable automobile interior construction as claimed in claim 2, said center section being in mutual compression with each of said opposite side sections at the fold between said center section and the respective opposite side section.

5. An inflatable automobile interior construction as claimed in claim 1, said bottom cushion means formed with shape retainer means in the form of arcuate closed loop vertical walls having air passage apertures therein which form compartments in communication via said air passage apertures with the main interior of said bottom cushion means.

* * * * *